March 26, 1935.    A. W. MINTO    1,995,619
DEVICE FOR LIFTING EGGS, FRUIT, OR THE LIKE
Filed May 18, 1934
Fig. 1.
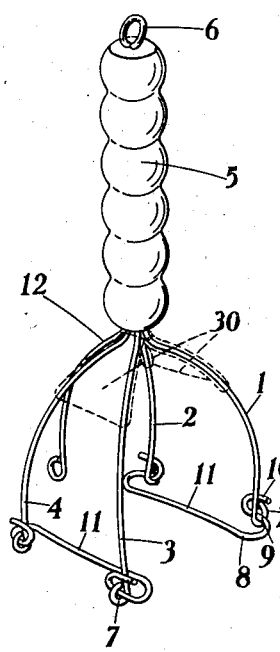
Fig. 2.
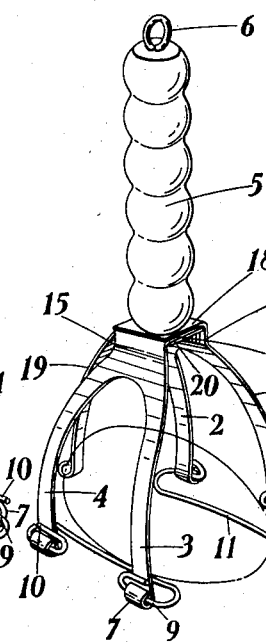
Fig. 3.
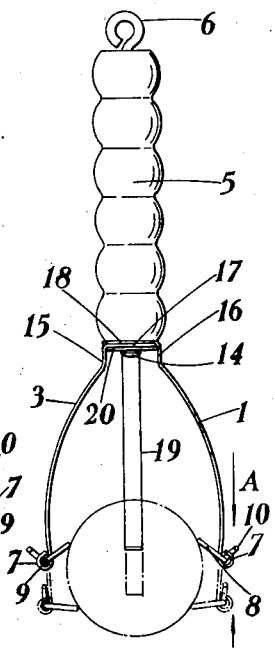
Fig. 4.
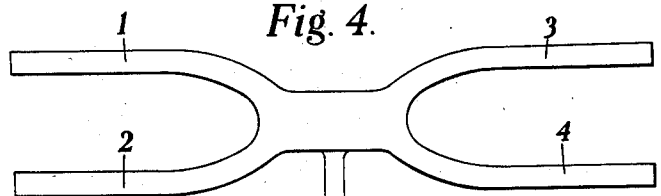
Fig. 5.
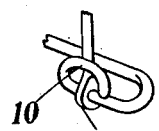
Fig. 6.
Fig. 8.
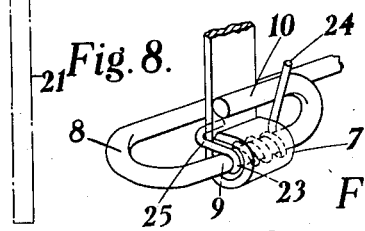
Fig. 7.
Fig. 9.
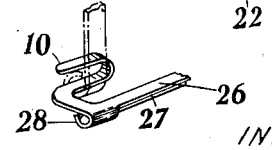
INVENTOR
Arthur William Minto
BY
*Henry J. Lucke*
HIS ATTORNEY Patented Mar. 26, 1935

1,995,619

UNITED STATES PATENT OFFICE 1,995,619

DEVICE FOR LIFTING EGGS, FRUIT, OR THE LIKE

Arthur William Minto, Rusthall, Tunbridge Wells, England

Application May 18, 1934, Serial No. 726,345
In Great Britain July 8, 1933

9 Claims. (Cl. 294—86)

This invention concerns a device for lifting eggs, fruit, or the like, and is more especially intended for lifting boiled eggs from saucepans, or for lifting eggs from waterglass which is harmful to the hands, but the device can also be used for lifting easily marked or damaged fruit such as peaches, apricots, tomatoes, and the like, and can also be used as an egg whisk.

Hereinafter (including the claims) for the sake of simplicity in explanation the word "egg" will be used for the present purpose as a generic term to include peaches, apricots, tomatoes and other easily damaged fruit, as well as eggs.

In order that the invention may be clearly understood and readily carried into practice I have appended hereto one sheet of drawings illustrating the same, wherein:—

Figure 1 is a perspective view of one form of egg lifter in accordance with this invention.

Figure 2 is a perspective view of a modified form of egg lifter also according to this invention.

Figure 3 is an end view of the egg lifter shown in Figure 2.

Figure 4 is a plan view of a blank from which to form a part of an egg lifter according to this invention.

Figure 5 is a perspective view of a detail of a further slightly modified form of egg lifter according to this invention.

Figure 6 is a part sectional plan showing a slight modification of a part of the egg lifter shown in Figures 2 and 3.

Figure 7 shows in cross sectional elevation a detail of a further slightly modified construction of egg lifter according to this invention.

Figure 8 shows in perspective a part of a still further slightly modified form of egg lifter according to this invention.

Figure 9 shows in perspective part of a modified form of a portion of an egg lifter according to this invention.

The egg lifter shown in Figure 1 comprises a skeleton saddle or cage (hereinafter referred to in the description as a saddle) formed by four approximately equally spaced arched prongs 1, 2, 3, and 4, all secured at their upper ends to a handle 5 which may have a loop 6 at its upper end by which the device may be hung up.

The lower ends of the prongs are spaced apart, and if joined by imaginary lines would be disposed at the corners of the rectangle formed by such lines.

The prongs are arranged in pairs, the prongs 1, 2 forming one pair, and the prongs 3, 4 constituting the other pair, and the saddle formed by these prongs is adapted to be passed over an egg which enters the saddle between the lower ends of the pairs of prongs, so that when the egg is within the saddle the pair of prongs 1, 2 is on the opposite side of the longitudinal axis of the egg to the pair of prongs 3, 4.

The lower end of each of the prongs is bent into the form of a loop or eye 7.

To the lower end of each pair of prongs is pivoted an egg engaging member or claw 8 (hereinafter referred to shortly as a claw).

Each claw 8 is formed from a piece of wire bent into a shallow U shape and having its end portions turned inwardly towards one another and forming trunnions 9, these trunnions passing inwardly through the adjacent eyes 7 of the corresponding prongs.

The outermost end parts 10 of the prongs are doubled back so as to be parallel to the trunnions 9 and on the outside of the eyes 7. The parts 10 constitute stops and lie across the prongs with which they are adapted to engage to limit the downward pivoting movement of the claws which are preferably only able to move downwardly into a position in which they lie in a substantially horizontal plane. The claws can move upwardly until they abut the inner sides of the prongs and when the claws are disposed in a substantially vertical plane. The parts 10, 9 and 11 of the claws are substantially parallel to one another, although parts 11 of the claws are given a slight curvature in their length. The claws on the opposite pairs of prongs project inwardly towards one another and into the space between the pairs of prongs and within the saddle formed thereby.

Between the pairs of prongs and adjacent one end of the saddle there is provided a further arched prong 12 which projects downwardly from the handle 5 and serves to close one end of the saddle so as to prevent an egg located in the saddle from leaving the latter at that end thereof at which is disposed the prong 12. The opposite end of the saddle is open and forms an exit by which the egg may leave the saddle, whilst the open lower end of the saddle forms an entrance to the saddle, the exit through such entrance of an egg once having entered the saddle being prevented by the claws 8 as subsequently described.

The prongs of each pair may be braced together by one or more pieces of strip metal shown in dotted lines at 30, Figure 1. Such bracing renders displacement of the eyes of the prongs not readily possible.

Figure 5 shows the eyes 7 of the prongs of the device as being made by flattening the ends of the prongs and then perforating them perpendicularly to the flat surfaces of these flattened ends. This figure also shows the parts 10 of the claws bent to form a closed loop so that in practice the extreme ends of the wires forming the claws are not liable to become entangled with anything else.

Figures 2 and 3 show a construction of egg lifter according to this invention in which the prongs 1, 2, 3 and 4 are made from sheet metal. This construction of egg lifter comprises a handle 5, to which are secured by a screw 14 or other suitable means, two sheet metal members 15 and 16, each of inverted Y shape form, the depending arms of the Y shaped members forming the prongs 1, 2, 3 and 4.

The stem portions 17 and 18 of the Y shaped members are bent at right angles to the axis of the handle 5 and are disposed one above the other, and by their interengagement, as clearly shown in Figures 2 and 3, these end portions of the Y members prevent the prongs of the one member turning relative to the prongs of the other member about the screw 14.

The prong 12 shown in Figure 1 is, in the construction shown in Figures 2 and 3, replaced by a strip metal prong 19 having a rectangular upper end part 20 fitting closely between the Y shaped members 15 and 16 and being secured to the handle by the screw 14.

The lower end of each prong, in the construction shown in Figures 2 and 3, is provided with an eye 7 (as in the construction shown in Figure 1) by rolling over into tubular form the ends of the prongs, and claws 8, of the form shown in Figure 1, are mounted in these eyes and serve the same purpose and act in the same way as the prongs shown in Figure 1.

Figure 4 shows a blank from which the two inverted Y shaped members 15 and 16 (described with reference to Figures 2 and 3) could be formed integrally, and in this figure is shown in dotted lines at 21 how the blank could be modified so that the prong 19 would be integral with the inverted Y shaped members.

The inverted Y shaped members or the blank shown in Figure 4 can be formed by any suitable pressing or stamping operation.

Figure 6 shows how the claws 8 could be bent so that their trunnions 9 enter the eyes 7 from the insides thereof instead of from the outsides as shown in Figures 1 to 3.

Figure 7 shows how the parts 11 of the prongs 8 described above can be provided with a metal sleeve 22 so as to weight the prongs to make their return from a vertical position to a horizontal position quicker.

If desired positively to return the claws to their horizontal position, springs can be provided, and Figure 8 shows one method of doing this. A helically coiled spring 23 is arranged around the trunnion 9 of a claw 8, in a construction such as is shown in Figures 2 and 3, and this spring is disposed in the eye 7 and has one end part 24 engaging the part 10 of the claw, and has its other end part 25 anchored to the adjacent prong of the device, so that the spring acts to return the claw to its normal substantially horizontal position.

Figure 9 shows a claw 26 formed as a sheet metal stamping or pressing applied to an egg lifter according to Figures 2 and 3. The claw is in general form very similar to the claw 8 previously described, and acts in the same way.

This claw may have, as shown, a weighting member 27 secured to the claw by metal tongues 28 thereon. If the egg engaging part is made sufficiently wide or thick, extra weight will not be necessary. The part 10 may be formed into a closed loop, as in Figure 5.

To raise an egg from, say, a pan of boiling water, a person takes hold of the handle 5 of a device according to this invention, and passes the saddle of the device over an egg, moving the saddle downwardly as indicated by arrow A Figure 3. During this movement the two claws 8 pivot upwardly as shown in full lines in Figure 3, but when the claws have passed over the centre of the egg they fall by gravity or spring pressure, as the case may be, into their more or less horizontal position, as shown in dotted lines in Figure 3, and then on lifting the device again the claws engage the egg on opposite sides of its longitudinal axis and support the egg whilst it is being lifted or carried. The egg cannot leave the saddle by the way in which it entered it.

When carrying the egg about from one place to another the saddle can be tilted slightly so that the egg or one end thereof rests against the retaining prong 12 or 19. To discharge the egg from the saddle the latter is tilted so that the egg slides along the claws and passes out of the open end of the saddle, that is, the end of the latter directly opposite the end at which the prong 12 or 19 is disposed.

One advantage of a device which is of skeleton or openwork form according to this invention is that an egg can be lifted thereby from a pan without raising water at the same time. Also an egg is more positively held than when lifted by a spoon. Furthermore an egg can be carried about by the device without touching the egg by hand. This is particularly an advantage when the egg has been in waterglass and has been lifted therefrom by the device. Also very little pressure is exerted on the egg by the claws of the device, and this is an especially useful advantage when the device is used for lifting or carrying peaches, or the like, or where it is used for carrying an egg having a soft shell.

In addition to being used as an egg lifter, the device can be used as an egg whisk by taking the handle between the palms of the hand with the handle vertical, and moving the palms backwards and forwards relative to one another with the handle acting as a roller therebetween whereby the prongs and claws of the device are rotated first in one direction and then in another and act admirably as an egg whisk.

What I claim is:—

1. An egg lifter comprising two pairs of spaced prongs, said pairs of prongs being spaced and shaped so as to be capable of receiving an egg therebetween, a handle to which each of the prongs is attached at one end, each prong having at the other end an eye, a pair of egg engaging members, one of which is carried by one pair of prongs and the other by the other pair, such egg engaging members being pivoted to the prongs by having trunnion parts passing through the eyes of their prongs, the egg engaging members projecting normally inwardly from the prongs and towards one another, and means being provided to prevent the egg engaging members pivoting in one direction from their normal position.

2. An egg lifter comprising two pairs of spaced arched prongs forming a saddle, a handle with which the said prongs are associated at one end, each prong having an eye at the other end and these ends of the prongs being spaced apart so that an egg can pass therebetween so as to lie within the four prongs, the axes of the two eyes of each pair of prongs being in alignment with one another, and the axes of the eyes of one pair of prongs being parallel to those of the eyes of the other pair of prongs, a pair of U shaped inwardly pivotal egg retaining members carried one by each pair of prongs and each having a pair of trunnion portions substantially parallel to the intermediate portion thereof and passing one through each of the eyes of the corresponding pair of prongs, and each egg retaining member having outer end portions disposed so as to form stops adapted to engage the adjacent prongs outside the eyes thereof for preventing the egg retaining member pivoting outwardly beyond a predetermined position.

3. An egg lifter according to claim 2 having a further prong disposed at one end of the said saddle and substantially centrally with respect to the two spaced pairs of prongs.

4. An egg lifter comprising a handle, two spaced pairs of spaced dependent arched legs forming a saddle and attached at one end to said handle, the other ends of the legs being free and disposed so that they would lie at the corners of a rectangle which would be formed by joining these ends together by straight lines, each prong having at the free end thereof an eye, the axes of the two eyes of each pair of legs being in alignment with one another, and the axes of the eyes of the one pair of legs being parallel to the axes of the eyes of the other pair of legs, a pair of wire shallow U shaped egg retaining members each having each of its opposite arms bent inwardly parallel to its intermediate part and passed through the eye of a prong, each egg retaining member extending between the two legs of one pair of legs and both egg retaining members projecting normally substantially horizontally towards one another and into the saddle, the end portions of said arms of the egg retaining members being again bent so as to lie transversely relative to the adjacent legs and adapted to engage the latter above the pivots of the egg engaging members when the latter are in their said normal position, and means at one end of the saddle adapted to prevent an egg leaving that end thereof.

5. An egg lifter according to claim 2, wherein said egg retaining members are weighted to ensure their return to the said predetermined position after having been moved therefrom.

6. An egg lifter according to claim 2, including spring means adapted to return said egg retaining members to the said predetermined position after being moved therefrom.

7. An egg lifter according to claim 4, wherein said legs are formed by a pair of separate or integral inverted Y shaped sheet metal members.

8. An egg lifter according to claim 4, wherein said legs are formed by a pair of separate inverted Y shaped sheet metal members having the stem portions disposed transversely to the other parts thereof to form attachment parts, and the attachment parts of the said two members interengaging to prevent relative rotation of the members.

9. An egg lifter comprising a handle, and a saddle consisting of two similar arched inverted Y shaped parts attached to said handle by the stem portions thereof and disposed on opposite sides of the axis of the handle, the arms of said inverted Y shaped parts forming four spaced legs arranged in two pairs, each of said legs being provided at its free lower end with an eye, the axes of the two eyes of each pair of legs being coaxial, and the axes of the eyes of one pair of legs being parallel to those of the eyes of the other pair of legs, a pair of shallow U shaped egg retaining members each having each of its opposite arms bent substantially parallel to its intermediate part and passed through the eye of a prong, each egg retaining member extending between the two legs of one pair of legs and both egg retaining members projecting normally substantially horizontally towards one another and into the saddle, the end portions of said arms of the egg retaining members being again bent so as to lie transversely relative to the adjacent legs and adapted to engage the latter above the pivots of the egg engaging members when the latter are in their said normal position, said inverted Y shaped members being non-rotatable relative to one another about the axis of said handle, and a fifth arched leg being provided and extending downwardly from the handle and disposed centrally in relation to the said pairs of legs but at one end of the saddle.

ARTHUR WILLIAM MINTO.